United States Patent [19]

Fisher et al.

[11] Patent Number: 5,179,512
[45] Date of Patent: Jan. 12, 1993

[54] GATE DRIVE FOR SYNCHRONOUS RECTIFIERS IN RESONANT CONVERTERS

[75] Inventors: Rayette A. Fisher, Schenectady; Robert L. Steigerwald, Burnt Hills; Alexander J. Yerman, Scotia, all of N.Y.

[73] Assignee: General Electric Company, Schenectady, N.Y.

[21] Appl. No.: 761,523

[22] Filed: Sep. 18, 1991

[51] Int. Cl.$^5$ .............................. H02M 7/217
[52] U.S. Cl. .......................... 363/127; 336/226
[58] Field of Search ............... 363/16, 17, 22, 24, 363/127, 200, 226, 232

[56] References Cited

U.S. PATENT DOCUMENTS

| | | | |
|---|---|---|---|
| 3,458,798 | 7/1969 | Fang et al. | 363/127 |
| 4,519,024 | 5/1985 | Federico et al. | 363/127 |
| 4,788,634 | 11/1988 | Schlecht et al. | 363/21 |
| 4,903,189 | 2/1990 | Ngo et al. | 363/127 |
| 4,922,404 | 5/1990 | Ludwig et al. | 363/127 |
| 4,953,068 | 8/1990 | Henze | 363/127 |
| 4,959,630 | 9/1990 | Yerman et al. | 336/83 |
| 5,017,902 | 5/1991 | Yerman et al. | 336/83 |

OTHER PUBLICATIONS

R. A. Fisher et al., "Performance of Low Loss Synchronous Rectifiers in a Series-Parallel Resonant DC-DC Converter", IEEE Applied Power Electronics Conference, 1989, pp. 240-248.

M. Alexander, R. Blanchard, R. Severns, "MOSFET's Move in on Low Voltage Rectification", MOS-POWER Applications Handbook, Siliconix Technical Article, pp. 5-74-5-80.

Primary Examiner—William H. Beha, Jr.
Attorney, Agent, or Firm—Jill M. Breedlove; Marvin Snyder

[57] ABSTRACT

A resonant converter, including a transformer for separating a high-voltage (primary) side from a relatively low-voltage (secondary) side, has at least one synchronous rectifier and an auxiliary sense winding coupled to the gate thereof. The input capacitances of the synchronous rectifiers are reflected to the primary side and the secondary side by the square of the ratio of the number of auxiliary sense winding turns to the number of primary and secondary winding turns, respectively, thereby reducing the required size of the discrete resonant capacitor. In one embodiment, a gate bias voltage approximately equal to the device threshold voltage is applied to the gate of the synchronous rectifiers. The auxiliary sense windings are etched into a conductive film pattern of the secondary windings. The auxiliary sense windings provide nearly identical secondary and gate drive voltages so that the synchronous rectifiers are gated substantially at the zero-voltage crossings of the secondary winding voltages. The result is a substantially lossless gate drive for synchronous rectifiers in high power density resonant converters.

16 Claims, 8 Drawing Sheets fig. 1 PRIOR ART fig. 2 fig. 6 fig. 7 fig. 8 fig. 9

GATE DRIVE FOR SYNCHRONOUS RECTIFIERS IN RESONANT CONVERTERS

FIELD OF THE INVENTION

The present invention relates generally to resonant converters and, more particularly, to a substantially lossless, resonant gate drive for synchronous rectifiers employed in resonant converters.

BACKGROUND OF THE INVENTION

In order to make high frequency, high power density converters practical, very high efficiency (e.g., 90%) operation is required. Synchronous rectifiers have been proposed for use in high frequency, high power density converters because of their much lower forward voltage drop than, for example, Schottky diodes. Unfortunately, however, synchronous rectifiers are typically gated using square-wave voltages generated from complex control logic which consumes more energy and occupies more space than is practical for a commercial power supply. In addition, switching losses occur unless the devices are switched with zero-voltage thereacross. Moreover, there is a lack of commercially available MOSFET's having a low on-resistance. As a result, the potential improvement in efficiency using synchronous rectification is insufficient to warrant production of a commercial power supply using this rectification technique.

Accordingly, it is desirable to eliminate losses and reduce the space required for a synchronous rectifier gate drive. Furthermore, it is desirable to provide more precise gating control in order to achieve zero-voltage switching and hence improve efficiency. To be practical, an improved synchronous rectifier gate drive must be relatively simple and easy to manufacture.

SUMMARY OF THE INVENTION

A parallel resonant converter, including a transformer for separating a relatively high-voltage (primary) side from a relatively low-voltage (secondary) side, has at least one synchronous rectifier and an auxiliary sense winding coupled to the gate thereof. In one embodiment, a gate bias voltage approximately equal to the device threshold voltage is applied to the gate of each synchronous rectifier. Each auxiliary sense winding comprises an auxiliary secondary winding which reflects impedances to the primary side and the secondary side of the converter. In particular, the input capacitances of the synchronous rectifiers are reflected to the primary side and the secondary side by the square of the ratio of the number of auxiliary sense winding turns to the number of primary and secondary winding turns, respectively. Advantageously, in a parallel resonant converter, this capacitance reflection reduces the required size of the discrete resonant capacitor; i.e., the reflected capacitance is part of the resonant capacitance.

According to a preferred embodiment of the present invention, the transformer comprises primary and secondary conductive film windings etched adjacent to each other on a dielectric membrane on opposite sides of a longitudinal axis. The auxiliary sense windings are formed by etching auxiliary conductive film windings in the conductive film pattern of the secondary windings. The conductive film component is then mandrel-wound, in barrel fashion, about a central axis to fit into a pot-core structure. Alternatively, the auxiliary sense windings of the present invention may be incorporated in the conductive film pattern of other types of conductive film windings. For example, the conductive film windings may be folded in accordion fashion, i.e., z-folded, and inserted into a pot-core.

In operation, the proximity of the auxiliary sense windings to the transformer secondary windings allows for nearly identical secondary and gate drive voltages, thereby enabling the synchronous rectifiers to be gated substantially at the zero-voltage crossings of the secondary winding voltages. No additional gate drive circuitry is required. The result is a substantially lossless gate drive for synchronous rectifiers in high power density, parallel resonant converters.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
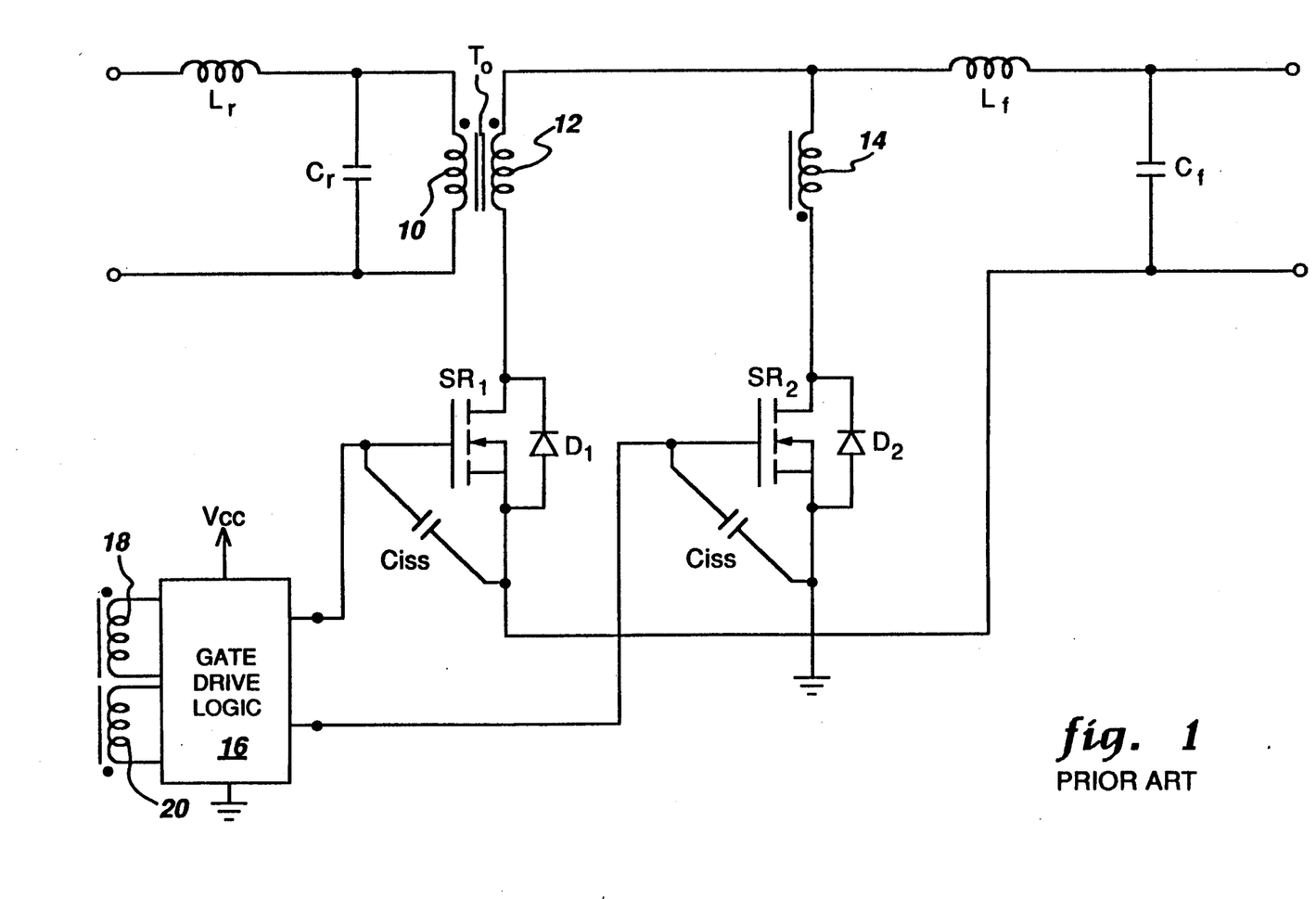
FIG. 1 schematically illustrates a parallel resonant converter employing synchronous rectifiers and a typical square-wave gate drive therefor.

FIG. 1 illustrates a parallel resonant converter including a transformer $T_o$ having a primary winding 10 and secondary windings 12 and 14 separating a relatively high-voltage (primary) side and a relatively low-voltage (secondary) side. Synchronous rectifiers $SR_1$ and $SR_2$ are each coupled in series with secondary windings 12 and 14, respectively. Each synchronous rectifier has an integral body diode $D_1$ and $D_2$, respectively, coupled in antiparallel therewith and an input parasitic capacitance $C_{iss}$ coupled between the gate and source thereof. Gate drive circuitry 16 is coupled to a dc power supply $V_{cc}$ for providing square wave voltages for driving synchronous rectifiers $SR_1$ and $SR_2$ in well-known fashion. The gate drive circuitry is coupled to the primary side of transformer $T_o$ via auxiliary sense windings 18 and 20. The parallel resonant converter further comprises a resonant inductor $L_r$ and a resonant capacitor $C_r$. For purposes of illustration, the resonant inductor and resonant capacitor are shown as being situated on the primary side of the converter; however, it is to be understood that the resonant capacitor could alternatively be situated on the secondary side. In addition, it is to be understood that two synchronous rectifiers $SR_1$ and $SR_2$ are shown by way of example only; that is, the principles of the present invention apply to parallel resonant converters employing one or more synchronous rectifiers. An output filter is shown in FIG. 1 as comprising a filter inductor $L_f$ and a filter capacitor $C_f$.

Exemplary gate drive circuitry is described in "Performance of Low Loss Synchronous Rectifiers in a Series-Parallel Resonant DC—DC Converter", by R. A. Fisher et al., IEEE Applied Power Electronics Conference, 1989, pp. 240-248. In particular, such gate drive circuitry generally comprises a pair of window comparators for converting the secondary winding voltage that is sensed by the auxiliary sense windings into drive control pulses. Gate drive logic circuitry uses these pulses to generate two synchronous rectifier gate drive signals, the rising and falling edges of which are determined by the trip points of the window comparators as set by potentiometers. The comparator output signals are level-shifted to drive buffer stages that supply output current drivers. The gate drive signals are ideally generated to be 180° out-of-phase and synchronous with the zero-voltage crossings of the drain-source voltage of the synchronous rectifiers. Disadvantageously, however, with such complex gate drive circuitry, some error in switching the rectifiers at the zero-voltage crossings generally occurs, thus resulting in switching losses. Moreover, such complex gate drive circuitry requires space and consumes energy in delivering power to the gate drive circuit and in discharging the input capacitances and requires an auxiliary dc power supply.

Figure 2:
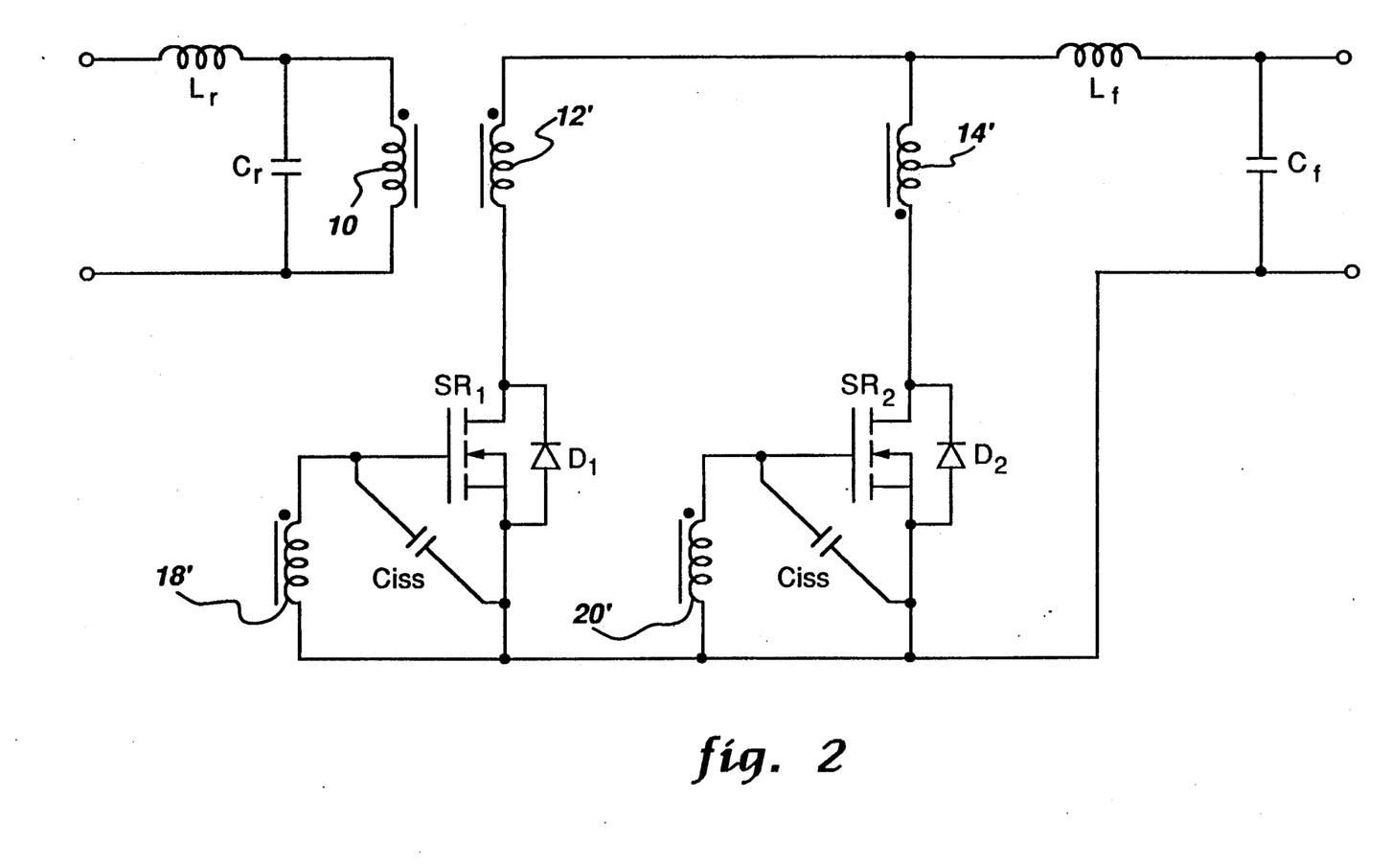
FIG. 2 schematically illustrates a a parallel resonant converter including a resonant lossless gate drive for driving synchronous rectifiers in accordance with the present invention.

FIG. 2 illustrates a parallel resonant converter employing auxiliary sense windings 18' and 20' coupled between the gates of synchronous rectifiers $SR_1$ and $SR_2$, respectively, and the secondary side ground according to the present invention. No additional gate drive circuitry is required. In operation, the close proximity of auxiliary sense windings 18' and 20' to secondary windings 12' and 14' results in substantially identical secondary and gate drive voltages. Moreover, since the secondary transformer voltage in a parallel resonant converter is substantially sinusoidal, the gate drive voltage applied to the synchronous rectifiers is substantially sinusoidal. Hence, substantially at the zero-voltage crossings of the secondary windings, the synchronous rectifiers are gated on or off in a substantially lossless manner. Practically, the synchronous rectifiers are gated on shortly after the zero-voltage crossings, i.e., at the threshold voltage of the devices. In the interim, the body diodes of the synchronous rectifiers conduct. Advantageously, the energy stored in each gate capacitance $C_{iss}$ is resonantly transferred to resonant inductor $L_r$ as the gate capacitances $C_{iss}$ discharge. Therefore, resonant operation is virtually lossless.

Auxiliary sense windings 18' and 20' reflect the input parasitic capacitances $C_{iss}$ to the primary and secondary sides of transformer $T_o$. The input parasitic capacitances $C_{iss}$ thus advantageously operate with resonant capacitor $C_r$ to resonate with resonant inductor $L_r$. The required size of resonant capacitor $C_r$ is thus reduced, thereby reducing the size of the converter.

Figure 3:
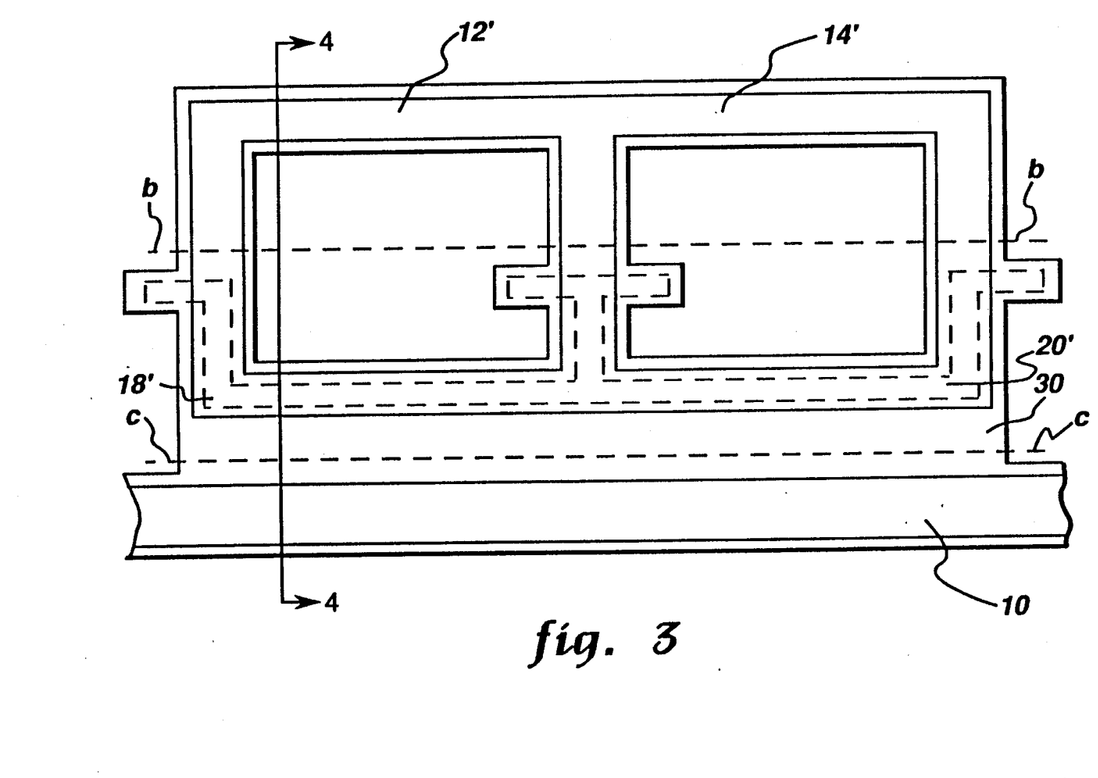
FIGS. 3 illustrates conductive film windings for use in a transformer according to the present invention.
Figures 4A, 4B, 4C:
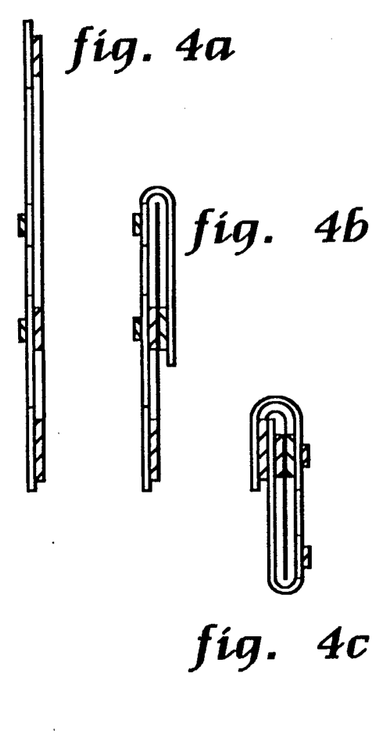
FIGS. 4a–4c are cross sectional views illustrating a preferred way of folding the conductive film windings of FIG. 3 for use in a transformer according to the present invention.

FIG. 3 illustrates a front view, and FIG. 4a illustrates a cross sectional view taken along line 4—4, of a transformer winding structure which incorporates an auxiliary sense winding according to a preferred embodiment of the present invention. As shown, secondary windings 12' and 14' and primary winding 10 are disposed on a dielectric membrane 30. Auxiliary sense windings 18' and 20' are shown as being etched on opposite sides of the dielectric membrane from the transformer secondary windings 12' and 14'. Alternatively, however, it is to be understood that the auxiliary sense windings may be etched into the secondary conductive film pattern on the side of the dielectric membrane, if desired. Furthermore, although the auxiliary windings are shown as being etched toward the center of the respective secondary windings, the auxiliary windings alternatively could be etched toward the edge of the secondary windings, if desired. Still further, the auxiliary windings could be etched into the entire secondary winding (e.g., to form a substantially figure-eight configuration corresponding to that of the secondary windings); in this way, the auxiliary winding resistance would be reduced; however, the secondary winding resistance would be increased.) For purposes of illustration, the secondary winding is shown and described herein as comprising a center-tapped winding; however, it is to be understood that the principles of the present invention apply to transformers without a tapped winding, as will be appreciated by those of ordinary skill in the art. Moreover, the auxiliary sense winding is shown as having a single turn per synchronous rectifier; however, it is to be understood that the auxiliary sense winding may have any number of turns. A suitable dielectric membrane comprises a polyimide film, such as that sold under the trademarks Kapton or a polyester film such as that sold under the trademark Mylar by E. I. du Pont deNemours and Company. Suitable conductive film windings are comprised of copper.

Figure 5:
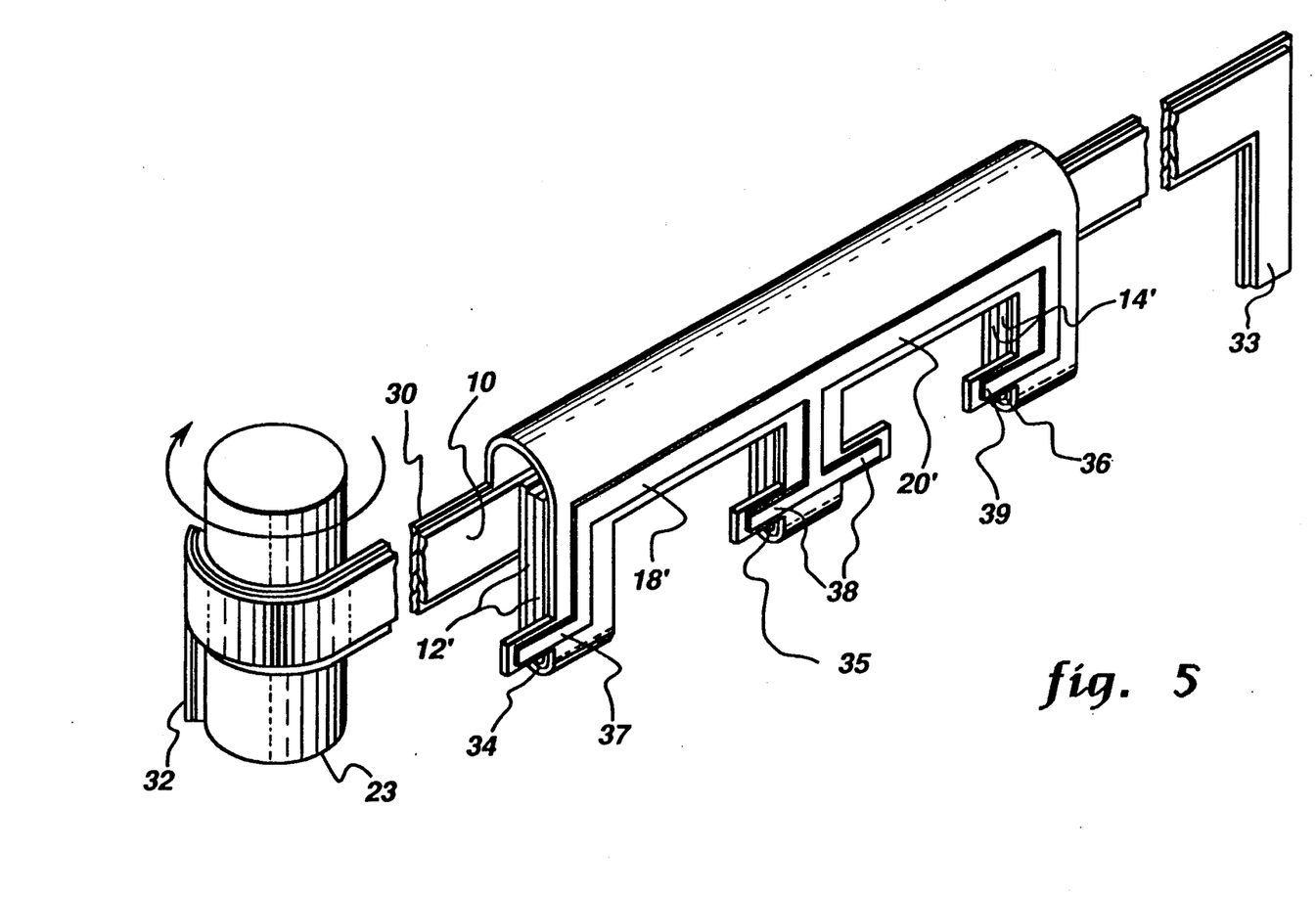
FIG. 5 is a perspective view illustrating the barrel-winding of the conductive film windings of FIG. 4.
Figure 6:
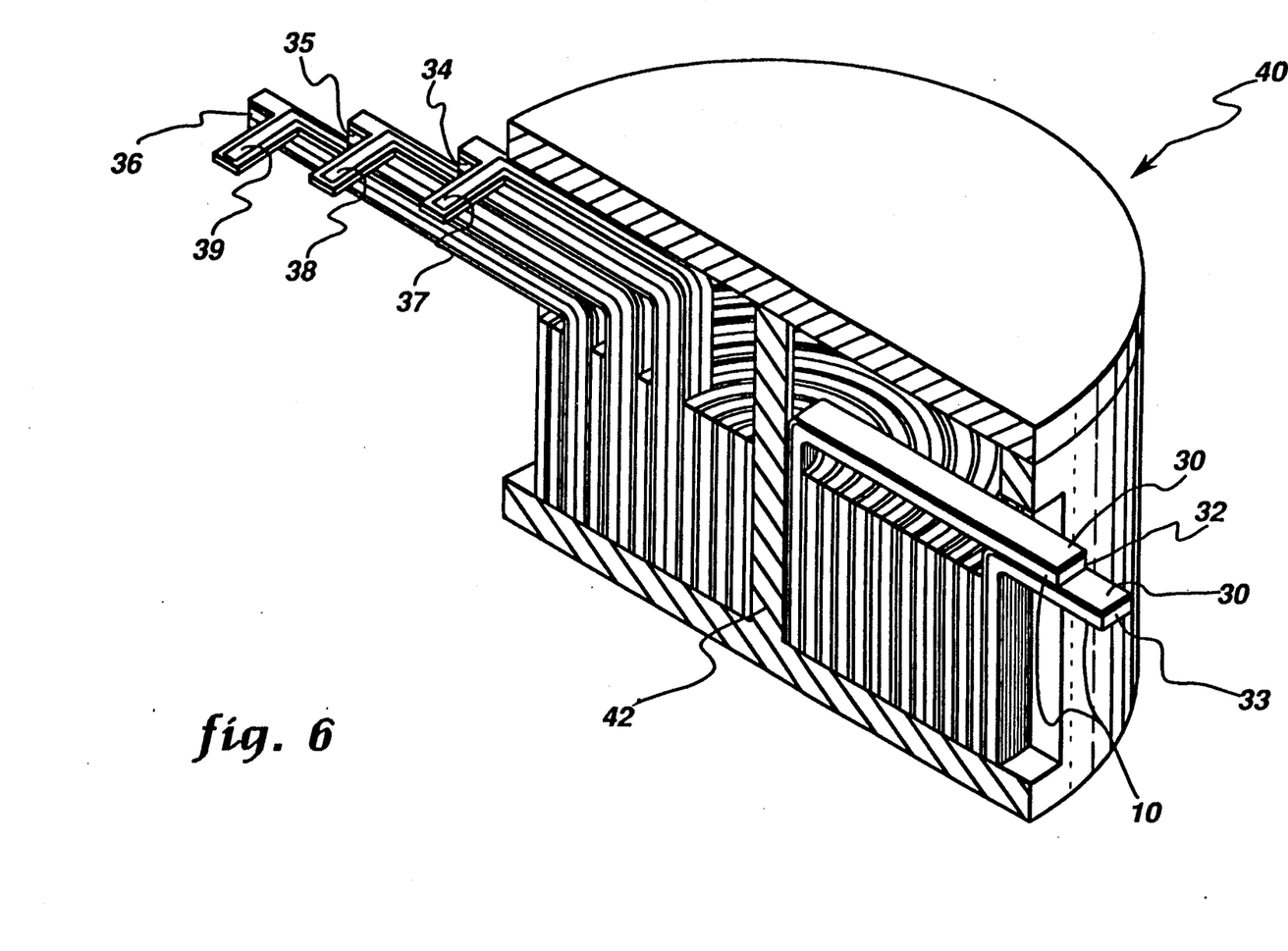
FIG. 6 is a cut-away perspective view of a conductive film transformer incorporating auxiliary sense windings according to a preferred embodiment of the present invention.

In a preferred embodiment, the transformer windings are folded and then barrel-wound in a manner such as described in commonly assigned, copending U.S. patent application, Ser. No. 548,468, of A. J. Yerman, which is incorporated by reference herein. As shown in FIG. 4b, the secondary winding is folded along line b—b (of FIG. 3) so that the upper and lower portions of the conductive film are folded toward each other. The winding structure is then folded along line c—c in the same direction of folding, as shown in FIG. 4c. The winding structure is then spiral-wrapped about a mandrel 23, shown in FIG. 5, to form a barrel-wound winding structure having primary terminals 32 and 33, secondary terminals 34–36 and auxiliary winding sense winding terminals 37–39. Finally, as illustrated in FIG. 6, the mandrel-wound winding structure is inserted into a pot core housing 40 having a core post 42.

The barrel-wound winding structure of FIG. 3 may alternatively folded in an opposite direction from that described hereinabove along fold lines b—b and/or c—c, if desired, as long as suitable insulating layers separate the winding turns as needed. The folding pattern of FIG. 4 is provided by way of example only.

Figure 7:
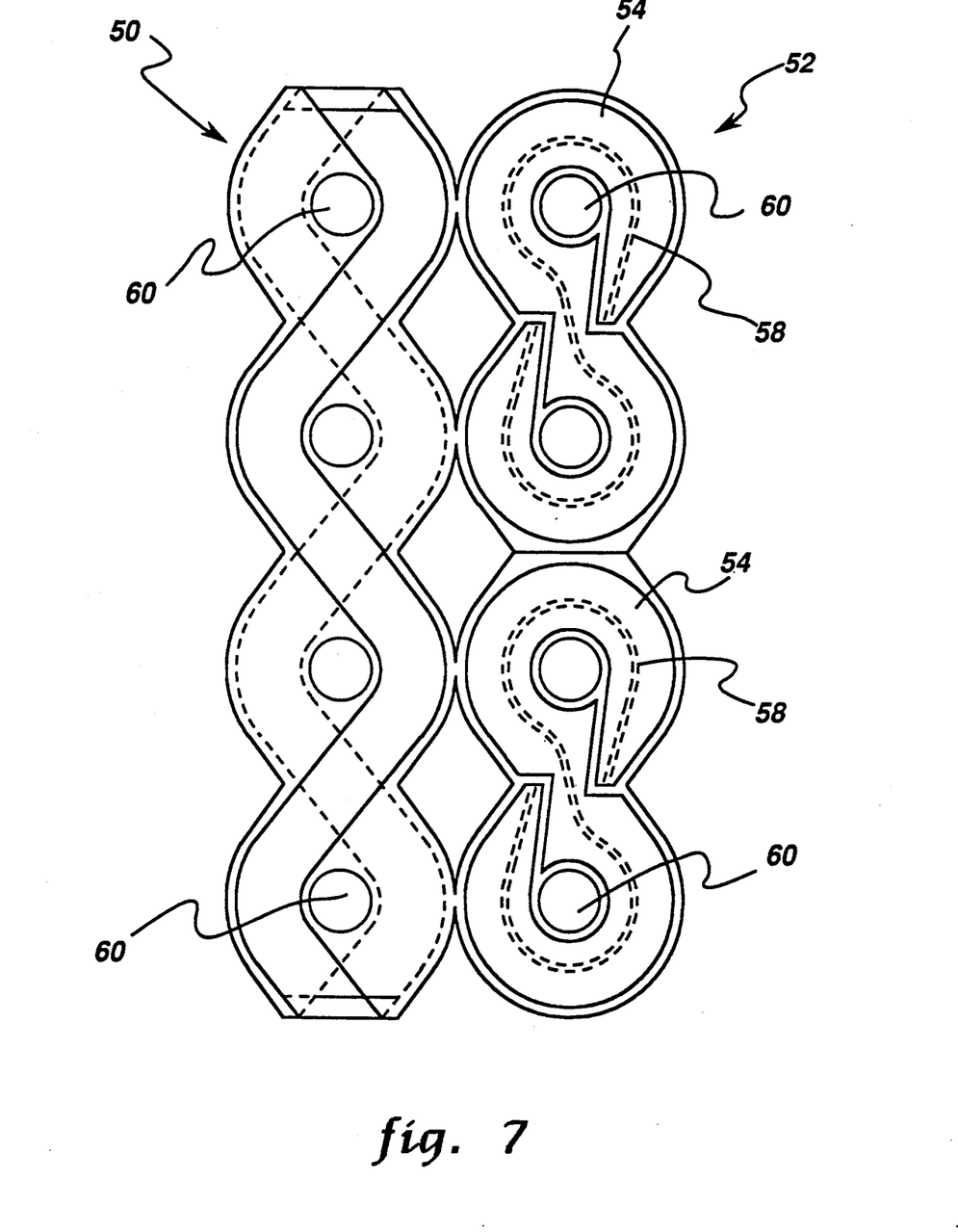
FIG. 7 illustrates a conductive film transformer winding having auxiliary sense windings incorporated therein according to an alternative embodiment of the present invention.

The auxiliary sense windings of the present invention may alternatively be incorporated into the conductive film pattern of other suitable types of conductive film windings. For example, FIG. 7 illustrates an alternative embodiment of a conductive film transformer structure wherein a primary winding 50 and a secondary winding 52 are of a type described in commonly assigned U.S. Pat. No. 4,959,630 of A. J. Yerman et al., issued Sept. 25, 1990, which is incorporated by reference herein. Auxiliary sense windings 58 are preferably situated on the opposite side of the dielectric membrane from the secondary conductive films 54 comprising secondary winding 52. The conductive film windings are folded first along the axis separating the primary and secondary windings and then in an accordion, or z-fold, fashion to form a stack of winding layers having an aperture 60 which receives a core post upon insertion of the stack into a pot-core housing, as described in U.S. Pat. No. 4,959,630.

In accordance with the present invention, auxiliary sense windings may be incorporated into other suitable conductive film windings, such as, for example, those described in commonly assigned U.S. Pat. No. 5,017,902 of A. J. Yerman et al., issued May 21, 1991, which is incorporated by reference herein.

Figure 8:
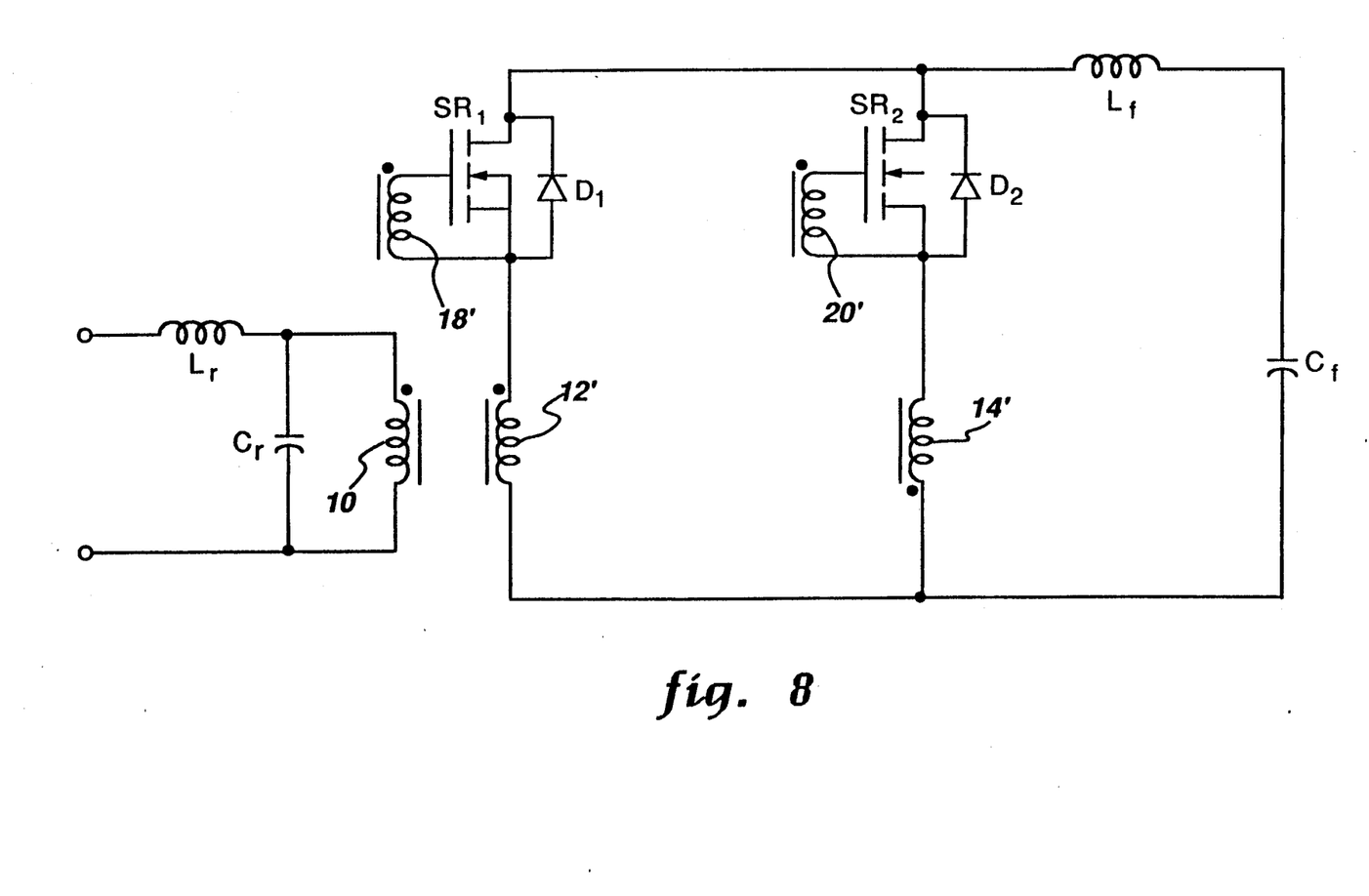
FIG. 8 illustrates an alternative embodiment of a parallel resonant converter according to the present invention.

FIG. 8 illustrates an alternative parallel resonant converter configuration employing auxiliary sense windings according to the present invention. As shown, auxiliary sense windings 18' and 20' are directly connected to the transformer secondary windings 12' and 14', respectively. For some applications, such a direct connection between the windings may be preferred because it may be easier to make and may provide a better (i.e., stronger) physical circuit connection since the gate winding terminals are generally thinner than the secondary winding terminals.

Figure 9:
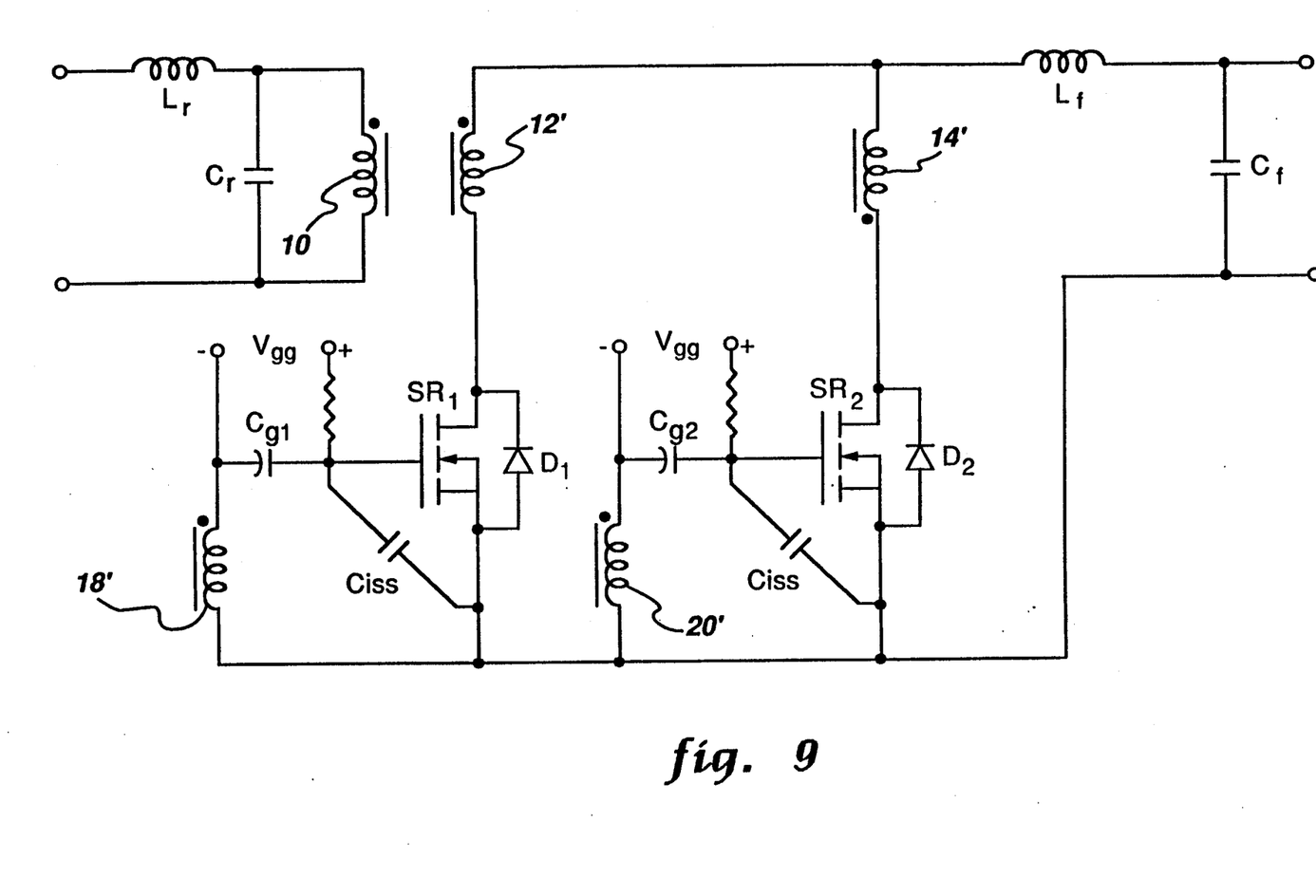
FIG. 9 illustrates still another alternative embodiment of a parallel resonant converter according to the present invention.

FIG. 9 illustrates still another alternative parallel resonant converter configuration according to the present invention wherein gate bias voltages $V_{gg}$ are provided across gate bias capacitors $C_{g1}$ and $C_{g2}$. Such a gate bias voltage may be provided by, for example, logic circuitry. Alternatively, in a power supply having at least one auxiliary regulated output and employing a resonant converter, the gate bias voltage may be provided by the auxiliary output. The gate bias voltage $V_{gg}$ is approximately equal to, but slightly less than, the threshold voltage of devices $SR_1$ and $SR_2$ in order to provide an adjustable dead time during which neither synchronous rectifier is conducting. In this way, the devices $SR_1$ and $SR_2$ are gated on more nearly at the zero-voltage Crossings of the secondary winding voltage, thus limiting body diode conduction and further providing more efficient conduction through the MOSFET channel. Alternatively, for some circuit topologies, it may be advantageous to provide a gate bias voltage that is slightly more than the threshold voltage which will allow conduction overlap of the synchronous rectifiers.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A resonant converter, comprising:

a transformer having a primary winding and at least one secondary winding separating a primary side and a secondary side, respectively, of said resonant converter, said primary and secondary windings each comprising barrel-wound conductive film windings, said transformer further comprising a magnetic housing for containing said windings;

a resonant inductor situated on said primary side;

a resonant capacitor situated on said primary side or said secondary side;

at least one synchronous rectifier comprising a transistor having a diode coupled in antiparallel therewith and further having an input parasitic capacitance coupled between the gate and source thereof; and a substantially lossless gate drive for each said synchronous rectifier comprising an auxiliary sense winding, said auxiliary sense winding reflecting said input parasitic capacitance so that said input parasitic capacitance combines with said resonant capacitor to resonate with said resonant inductor, said auxiliary sense winding being disposed in the conductive film patter of said secondary winding.

2. A resonant converter, comprising:

a transformer having a primary winding and at least one secondary winding separating a primary side and a secondary side, respectively, of said resonant converter, said primary and secondary windings each comprising conductive film windings, said windings being folded in an accordion fashion to form a stack of winding layers, said transformer further comprising a magnetic housing for containing said windings;

a resonant inductor situated on said primary side;

a resonant capacitor situated on said primary side or said secondary side;

at least one synchronous rectifier comprising a transistor having a diode coupled in antiparallel therewith and further having an input parasitic capacitance coupled between the gate and source thereof; and a substantially lossless gate drive for each said synchronous rectifier comprising an auxiliary sense winding, said auxiliary sense winding reflecting said input parasitic capacitance so that said input parasitic capacitance combines with said resonant capacitor to resonate with said resonant inductor, said auxiliary sense winding being disposed in the conductive film pattern of said secondary winding.

3. The resonant converter of claim 5 or claim 2 wherein said secondary winding comprises a tapped secondary winding.

4. The resonant converter of claim 5 or claim 2 wherein one end of each said secondary winding is directly connected to one end of the corresponding auxiliary winding.

5. The resonant converter of claim 1 or claim 2, further comprising a capacitor coupled in series with the gate of each said synchronous rectifier and the corresponding auxiliary sense winding for coupling a gate bias voltage to the gate of said synchronous rectifier.

6. The resonant converter of claim 5 wherein said gate bias voltage is substantially equal to the threshold voltage of said synchronous rectifier in order to have a substantially zero dead-time.

7. The resonant converter of claim 5 wherein said gate bias voltage is substantially equal to, but slightly less than, the threshold voltage of each said synchronous rectifier in order to provide an adjustable deadtime during which each said synchronous rectifier is not conducting.

8. The resonant converter of claim 5 wherein aid gate bias voltage is substantially equal to, but slightly more than, the threshold voltage of each said synchronous rectifier in order to allow an adjustable conduction overlap thereof.

9. A power supply for providing a dc output voltage and at least one regulated auxiliary output, comprising:
 a resonant converter including a transformer having a primary winding and at least one secondary winding separating a primary side and a secondary side, respectively, of said resonant converter, said resonant converter further including a resonant inductor and a resonant capacitor, said resonant converter further including at least one synchronous rectifier comprising a transistor having a diode coupled in antiparallel therewith and further having an input parasitic capacitance coupled between the gate and source thereof; and
 a substantially lossless gate drive for each said synchronous rectifier comprising an auxiliary sense winding, said auxiliary sense winding reflecting said input parasitic capacitance so that said input parasitic capacitance combines with said resonant capacitor to resonate with said resonant inductor, said gate drive including a gate drive capacitor coupled across said auxiliary output, said gate drive capacitor further being coupled in series with the gate of each said synchronous rectifier and the corresponding auxiliary sense winding for coupling a gate bias voltage from said auxiliary output to the gate of each said synchronous rectifier.

10. The power supply of claim 9 wherein said primary and secondary windings each comprise barrel-wound conductive film windings, said auxiliary sense winding being disposed in the conductive film pattern of said secondary winding, said transformer further comprising a magnetic housing for containing said windings.

11. The power supply of claim 9, wherein said primary and secondary windings each comprise conductive film windings, said auxiliary sense winding being disposed in the conductive film pattern of said secondary winding, said transformer further comprising a magnetic housing for containing said windings, said dielectric layer being folded in an accordion fashion to form a stack of winding layers.

12. The power supply of claim 9 wherein said secondary winding comprises a tapped secondary winding.

13. The power supply of claim 9 wherein one end of each said secondary winding is directly connected to one end of the corresponding auxiliary winding.

14. The power supply of claim 9 wherein said gate bias voltage is substantially equal to the threshold voltage of said synchronous rectifier.

15. The power supply of claim 9 wherein said gate bias voltage is substantially equal to, but slightly less than, the threshold voltage of each said synchronous rectifier in order to provide an adjustable dead-time during which each said synchronous rectifier is not conducting.

16. The power supply of claim 9 wherein said gate bias voltage is substantially equal to, but slightly less than, the threshold voltage of each said synchronous rectifier in order to allow an adjustable conduction overlap thereof.

* * * * *